(12) United States Patent
Natarajan et al.

(10) Patent No.: US 9,014,011 B2
(45) Date of Patent: Apr. 21, 2015

(54) SYSTEMS AND METHODS FOR LAYER-2 TRAFFIC POLARIZATION DURING FAILURES IN A VIRTUAL LINK TRUNKING DOMAIN

(71) Applicant: Dell Products L.P., Round Rock, TX (US)

(72) Inventors: Avinash Natarajan, Tamilnadu (IN); Ramasubramani Mahadevan, Tamilnadu (IN)

(73) Assignee: Dell Products L.P., Round Rock, TX (US)

( * ) Notice: Subject to any disclaimer, the term of this patent is extended or adjusted under 35 U.S.C. 154(b) by 119 days.

(21) Appl. No.: 13/758,884

(22) Filed: Feb. 4, 2013

(65) Prior Publication Data

US 2014/0219081 A1 Aug. 7, 2014

(51) Int. Cl.
| | |
|---|---|
| *H04L 12/26* | (2006.01) |
| *H04L 12/24* | (2006.01) |
| *H04L 12/46* | (2006.01) |
| *H04L 12/703* | (2013.01) |
| *H04L 12/54* | (2013.01) |
| *H04L 12/44* | (2006.01) |
| *H04L 12/709* | (2013.01) |
| *H04L 12/721* | (2013.01) |

(52) U.S. Cl.
CPC .............. *H04L 41/0659* (2013.01); *H04L 12/56* (2013.01); *H04L 12/44* (2013.01); *H04L 12/4641* (2013.01); *H04L 45/245* (2013.01); *H04L 45/28* (2013.01); *H04L 45/66* (2013.01); *Y02B 60/43* (2013.01)

(58) Field of Classification Search
CPC ................................ H04L 12/44; H04L 12/56
USPC ......................................... 370/242, 245, 252
See application file for complete search history.

(56) References Cited

U.S. PATENT DOCUMENTS

| | | | |
|---|---|---|---|
| 2005/0213582 | A1 | 9/2005 | Wakumoto et al. |
| 2005/0249124 | A1 | 11/2005 | Elie-Dit-Cosaque et al. |
| 2007/0223399 | A1 | 9/2007 | Yang et al. |
| 2008/0002570 | A1* | 1/2008 | Kurokawa et al. ............ 370/219 |
| 2008/0095047 | A1* | 4/2008 | Skalecki et al. .............. 370/225 |
| 2008/0285555 | A1* | 11/2008 | Ogasahara .................... 370/389 |

(Continued)

OTHER PUBLICATIONS

PCT International Search Report and Written Opinion mailed Dec. 17, 2013, in related International Application No. PCT/US2013/058308.

(Continued)

*Primary Examiner* — Farah Faroul
(74) *Attorney, Agent, or Firm* — Haynes and Boone, LLP (57) ABSTRACT

An information handling system is provided. The information handling system includes a first network switch configurable, the first network switch having a computer processor in communication with a plurality of ports for receiving and sending frames and a memory coupled to the computer processor and including a media access control (MAC) address table. The computer processor is configured to read frames, each frame having a header, and is also configured to associate a MAC address with a parent link aggregation group (LAG) except while a downstream link failure is detected. The computer processor is configured to associate the MAC address with a sub-LAG while a downstream link failure is detected. Methods for directing traffic through a virtual link trunking (VLT) domain during failure of a downstream link are also provided.

20 Claims, 6 Drawing Sheets

(56) References Cited

U.S. PATENT DOCUMENTS

| | | | |
|---|---|---|---|
| 2009/0245112 A1* | 10/2009 | Okazaki | 370/236 |
| 2009/0259810 A1 | 10/2009 | Baden et al. | |
| 2010/0246387 A1 | 9/2010 | Krishnan et al. | |
| 2012/0033669 A1 | 2/2012 | Mohandas et al. | |
| 2012/0033678 A1* | 2/2012 | Page et al. | 370/401 |
| 2012/0182866 A1* | 7/2012 | Vinayagam et al. | 370/228 |
| 2012/0275297 A1 | 11/2012 | Subramanian | |
| 2014/0036924 A1* | 2/2014 | Christenson | 370/395.53 |
| 2014/0133486 A1* | 5/2014 | Sivasankar et al. | 370/392 |
| 2014/0211637 A1* | 7/2014 | Sawal et al. | 370/244 |
| 2014/0215027 A1* | 7/2014 | Janardhanan | 709/220 |
| 2014/0241374 A1* | 8/2014 | Krishnamurthy | 370/401 |
| 2014/0254604 A1* | 9/2014 | Janardhanan et al. | 370/401 |

OTHER PUBLICATIONS

Chiruvolu et al., "Issues and Approaches on Extending Ethernet Beyond LANs", Mar. 2004, Retrieved from the internet: <URL: http://citeseerx.ist.ptu.edu/viewdoc/download?doi=10.1.1.3.2703&rep=rep1&type=pdf>.

Dell, Dell Force10 VLT Technical Guide, Jun. 15, 2012, Retrieved from the internet: <URL: http://i.dell.com/sites/doccontent/shared-content/data-sheets/en/Documents/Dell_Force10_S4810_VLT_Technical_Guide.pdf>.

Cisco, Cisco Active Network Abstraction 3.6.7 Technology Support and Information Model Reference Manual [ retrieved on Nov. 27, 2013], Retrieved from the internet: <URL: http://www.cisco.com/en/US/docs/net_mgmt/active_network_abstraction/3.6.7/tech_support/guide/Technology_Support.pdf>.

\* cited by examiner

SYSTEMS AND METHODS FOR LAYER-2 TRAFFIC POLARIZATION DURING FAILURES IN A VIRTUAL LINK TRUNKING DOMAIN

BACKGROUND

1. Technical Field

The present disclosure is related to information handling systems. In particular, embodiments disclosed herein are related to traffic on interconnect links between network devices.

2. Discussion of Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Currently, some information handling systems may take the form of a plurality of Layer-2 switches connected together in various arrangements using a variety of protocols. In some information handling systems, groups of links between one switch and another switch may be joined together and managed as a group. To provide redundancy and to enable load balancing, one switch may be connected to a pair of switches by two groups of links that are managed together as a single group. However, such link aggregation can become counterproductive in the event of a link failure. Thus, current aggregation handling in information handling systems has not been completely satisfactory.

SUMMARY

Consistent with some embodiments, there is provided an information handling system. The information handling system includes a first network switch that has a computer processor in communication with a plurality of ports for receiving and sending frames and a memory coupled to the computer processor and including a media access control (MAC) address table. The computer processor is configured to read frames having headers and to associate a MAC address with a parent link aggregation group (LAG) except while a downstream link failure is detected. While the downstream link failure is detected, the computer processor is configured to associate the MAC address with a sub-LAG rather than the parent LAG.

Consistent with some embodiments, there is further provided a method for directing traffic through a set of redundant links during failure of a downstream link. The method includes the steps of detecting a downstream failure indicator having a first value in a header of a first frame received with a media access control (MAC) address as its source MAC address and of determining whether the first frame was received on a first set of links or a second set of links. The method further includes steps of associating the source MAC address with the set of links on which the first frame was received and of hashing a plurality of frames on the set of links on which the first frame was received, the plurality of frames having the MAC address as their destination MAC address.

Consistent with some embodiments, there is further provided a method for directing traffic through a set of redundant links during failure of a downstream link. The method includes the steps of receiving, at a first VLT peer, a communication from a second VLT peer that the second VLT peer is experiencing a link failure on a link with a downstream node and of receiving, at the first VLT peer, a frame from the downstream node, the frame including a media access control (MAC) address of the downstream node. The method further includes steps of setting a downstream link failure indicator in the frame to a first value and of forwarding the frame, with the downstream link failure indicator set to the first value, to an upstream networking device.

These and other embodiments will be described in further detail below with respect to the following figures.

For clarity of discussion, elements having the same designation in the drawings may have the same or similar functions. The drawings may be better understood by referring to the following Detailed Description.

DETAILED DESCRIPTION

In the following description specific details are set forth describing certain embodiments. It will be apparent, however, to one skilled in the art that the disclosed embodiments may be practiced without some or all of these specific details. The specific embodiments presented are meant to be illustrative, but not limiting. One skilled in the art may realize other material that, although not specifically described herein, is within the scope and spirit of this disclosure.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Some embodiments of information handling systems include non-transient, tangible, machine-readable media that include executable code that when run by a processor, may cause the processor to perform the steps of methods described herein. Some common forms of machine-readable media include, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read.

Figure 1A:
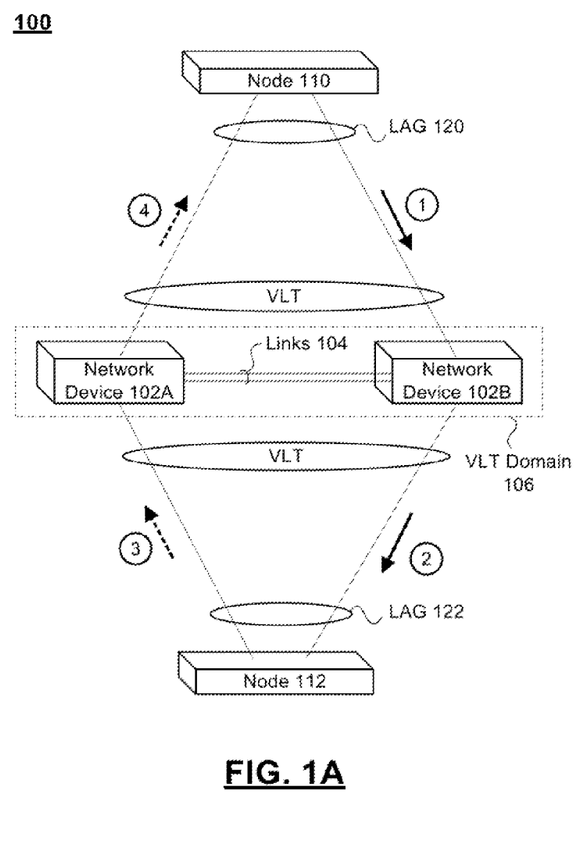
FIG. 1A is a diagram of an information handling system that includes two switches configured as a single logical switch during ordinary operation.

FIG. 1 depicts an information handling system 100 that includes a first network device 102A and a second network device 102B joined together by interconnect links (ICL) 104, thereby forming an aggregation domain 106. In the depicted embodiment, network devices 102A and 102B are Layer-2 switching devices connected in a virtual link or line trunking (VLT) configuration by links 104 in order to form a VLT domain 106. VLT is a Layer-2 link aggregation protocol that allows servers, hosts, or any other switching device to be connected to different switches to provide redundancy and load-balancing between a server and two different logical switches. Hereafter, network devices 102A and 102B are referred to as switch 102A and switch 102B, respectively. However, the disclosure provided herein is applicable beyond Layer-2 switching devices. By configuring switches 102A and 102B in VLT domain 106, switches 102A and 102B may be visible in information handling system 100 as two distinct switches. In other embodiments of information handling system 100, switches 102A and 102B may be configured in a stacking arrangement, such that both switches together are visible in information handling system 100 as a single logical device.

Switches 102A and 102B are connected to a top node 110 and a bottom node 112 as depicted in FIG. 1A. In the depicted embodiment top node 110 and bottom node 112 are servers, while in other embodiments they may be top-of-rack switches connected to a plurality of servers. In FIG. 1A, and through the other figures, the links between one of switches 102A and 102B and one of the nodes 110 and 112 appear as a single line. However, in each case, the single line represents a plurality or a set of links.

Thus, while a single line in FIG. 1A connects switch 102A and node 110, a set of links is present between switch 102A and node 110, and another set of links is present between switch 102B and node 110. Depicted on the other side of VLT domain 106, a set of links couples switch 102A to node 112 and another set of links couples switch 102B to node 112. The two sets of links on the top and on the two on the bottom of FIG. 1A are each grouped together to form a VLT. Thus, when node 110 sends a frame to node 112, the frame is hashed on a link aggregation group (LAG) 120 that includes the two sets of links between node 110 and switches 102A and 102B. The packets may be hashed to either of the two switches and then over the set of links between that receiving switch and node 112, which receives the frame as on a LAG 122. In some embodiments, nodes 110 and 112 may be connected to more than two logical switches in a VLT domain, i.e. more than switches 102A and 102B.

Numbered arrows are provided on FIG. 1A to demonstrate how information handling system 100 may normally operate to send frames between nodes 110 and 112. As an example, a Layer-2 frame that includes a media access control (MAC) address is first hashed on LAG 120 and is directed by the hash to switch 102B. Second, switch 102B receives the frame and recognizes that the MAC address, included as the frame's destination MAC address, is located at node 112. Rather than send the frame over links 104, switch 102B forwards the packet directly to node 112, which receives the packet as on LAG 122. Third, the frame elicits a response from node 112, which is hashes a responsive frame on LAG 122 to switch 102A. In this example, the hash sends the responsive frame to switch 102A rather than 102B. Fourth, switch 102A forwards the packet on to node 110, which receives the frame on LAG 120. In the preceding example, the hashes performed by node 110 to send the frame out on a member port of LAG 120 and by node 112 to send the responsive frame out on a member port of LAG 122 could have resulted in the frames being sent on the other sets of links in their respective LAGs such that the frame may go to the switch other than the one in the example.

Figure 1B:
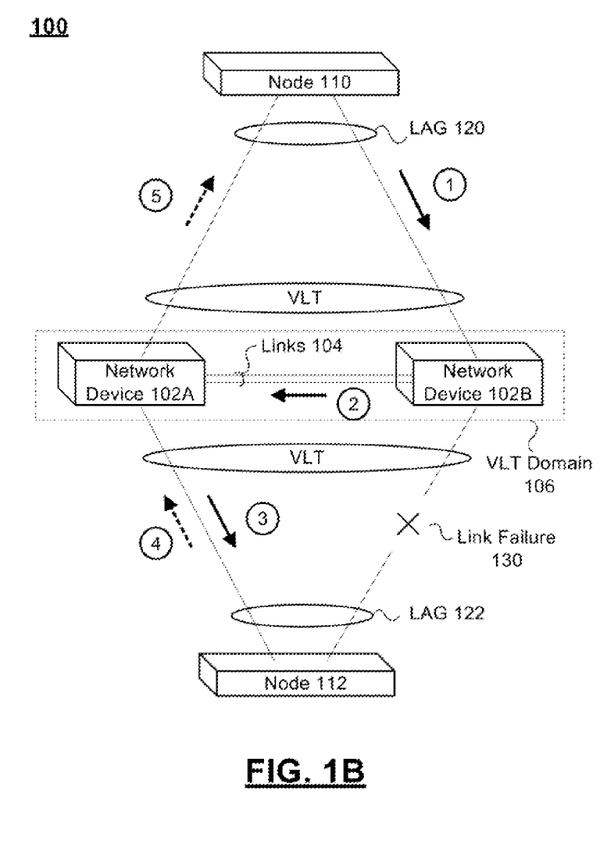
FIG. 1B is a diagram of an information handling system that includes two switches configured as a single logical switch during a downstream link failure.

FIG. 1B contains the same features as described above in connection with FIG. 1A. However, as depicted in FIG. 1B, the information handling system 100 now is experiencing a link failure 130 on the set of links between node 112 and switch 102B. Due to the link failure 130, no frames may be sent directly between node 112 and switch 102B. For example, while a frame from node 110 may still be hashed to switch 102B, the frame is then sent by switch 102B, which detects and responds to link failure 130, over links 104 to switch 102A. From switch 102A, the frame is sent to node 112. Node 112 also detects the link failure 130 and hashes a responsive frame only on the set of links between it and switch 102A, which then forwards the responsive frame directly to node 110.

In FIG. 1B, the path of the frame sent from node 110 to node 112 contains an extra hop, adding latency to the flow of data between these nodes. Also, the frame had to be sent between switches 102A and 102B over links 104 which may be oversubscribed and not able to carry the extra traffic. In this manner, link failure 130 degrades the performance of information handling system 100.

Figure 2A:
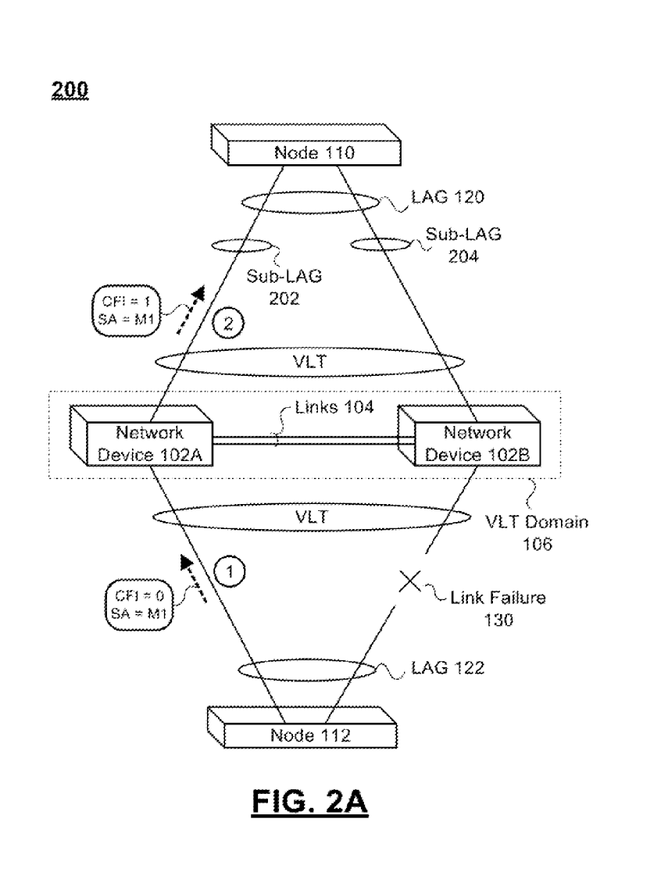
FIG. 2A is a diagram of an information handling system that includes two switches configured as a single logical switch during a downstream link failure according to an embodiment.

FIG. 2A is a diagram of an information handling system 200 that is similar in many respects to information handling system 100 of FIGS. 1A and 1B. Thus, information handling system 200 includes switches 102A and 102B and nodes 110 and 112 configured largely as seen in information handling system 100. However, through the operation of link layer discovery protocol (LLDP) on nodes 110 and 112 and switches 102A and 102B, node 110 knows that it is connected to switches 102A and to switch 102B, which node 110 knows are two separate switches.

LLDP functions by the exchange of LLDP data units among the nodes and switches in information handling system 200. Each of the LLDP data units includes a source MAC address of the sender, chassis identifiers, and other information. The chassis identifier is a type-length-value (TLV) element, Chassis ID TLV. Node 110 is configured to receive LLDP data units and to extract information from them so that node 110 can determine which of its plurality of ports are connected to switch 102A and which are connected to switch 102B. Node 110 is further configured to form two sub-LAGs, a first sub-LAG 202 including the links to switch 102A and a second sub-LAG 204 including the links to switch 102B. All of the links in the first and second sub-LAGs are members of LAG 120, which hereinafter is referred to as parent LAG 120. Alternatively, the links connecting node 110 to switches 102A and 102B and node 112 to switches 102A and 102B are configured as port-channels, a port-channel being similar in many respects to a LAG. In such an instance, sub-LAGs 202 and 204 are sub-port-channels of a parent port-channel.

When a frame is being sent from node 110 to node 112, the destination MAC of the frame is used to perform a lookup in a MAC address tables stored in a local memory of node 110. If the MAC address table includes an entry associating the MAC address of node 112 (being used as the destination MAC of the frame) with parent LAG 120, then the frame is hashed on parent LAG 120. In such an instance, the frame could be sent to any of the member ports of parent LAG 120, so that the frame could be sent to either switch 102A or 102B. If the MAC address table includes an entry associating the MAC address with first sub-LAG 202, then the frame is forwarded on one of the links to switch 102A, not to switch 102B. The MAC address table stored in the local memory of node 110 may also include a field for virtual local area network identifiers (VLAN IDs).

In general, node 110 learns to associate the MAC address of node 112 with parent LAG 120 by receiving frames from node 112 that include the MAC address as the source MAC address and include a particular VLAN ID. However, node 110 is configured to alter the MAC address table when a frame is received that includes a downstream link failure indicator. In information handling system 200, when node 110 receives a frame having the downstream link failure indicator set to a first value and the frame includes a destination MAC address, node 110 can rewrite its MAC address table so that the MAC address and VLAN ID contained in the frame are associated with whichever sub-LAG receives the frame.

FIG. 2A depicts the receipt of a frame at node 110 from node 112. The frame may be a responsive frame, responsive to an earlier frame from sent from node 110 to node 112. When the frame is sent from node 112, it includes the MAC address of node 112, M1, as its source MAC address. The frame also includes a downstream link failure indicator set to a value that does not indicate the presence of the downstream link failure 130. In this example, the downstream link failure indicator is a Canonical Format Indicator (CFI) bit that is present in tagged frames, frames having a VLAN tag header. The bit is set to "0", which does not indicate the presence of the link failure 130. In other embodiments where the frame is not a tagged frame when sent from node 112 to switch 102A, switch 102A may be configured to add a priority tag that includes a CFI bit to the frame before forwarding it on to node 110.

Switch 102A receives the frame, and having notice from switch 102B of the link failure 130, sets the value of the downstream link failure indicator. In this example, switch 102A sets the CFI bit to "1" to indicate that a downstream link failure has been detected. In embodiments in which the frame was not sent from node 112 to switch 102A as a tagged frame including the CFI bit, a priority tag is added by switch 102A that includes a CFI set to "1" and the priority set to "0". Thus, the frame moving between switch 102A and node 110 includes the CFI bit set to "1" and M1 as the source MAC address.

Node 110 receives the frame having the CFI bit set to "1" to indicate the downstream link failure. Because the frame is received by node 110 on the links between it and switch 102A, by configuration it interprets this information as indicating that the link between node 112 and switch 102B has failed. Node 110 is configured to understand that the frame containing the downstream link failure indicator is received on links that are not coupled to the switch experiencing the failure, in this case switch 102B. In response to the downstream link failure indicator having the value indicating the presence of a link failure 130, node 110 re-writes the entry in its MAC address to associate the MAC address M1 with sub-LAG 202, the sub-LAG that contains the ports on which the indicator was received.

Figure 2B:
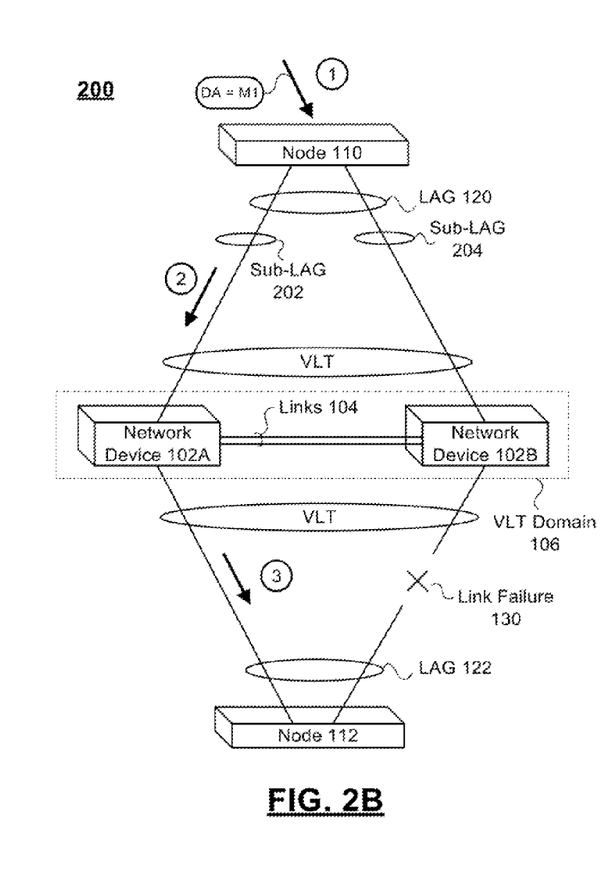
FIG. 2B is a diagram of an information handling system that includes two switches configured as a single logical switch during a downstream link failure according to an embodiment.

In FIG. 2B, the information handling system 200 with its MAC address table directing traffic to M1 to be sent out on sub-LAG 202 behaves differently than information handling system 100 of FIGS. 1A and 1B. First, a frame arrives at node 110 having M1 as its destination MAC address. To send it out, node 110 performs a look-up in its MAC address table that indicates the frame should be sent out on sub-LAG 202. Second, the frame is hashed on sub-LAG 202 and sent out on a member port to switch 102A. Because the look-up did not indicate the frame was to be sent out on parent LAG 120, the frame could not have been forwarded to switch 102B. Third, the frame arrives at switch 102A, which then forwards it on to node 112. By hashing the frame on sub-LAG 202 rather than parent LAG 120, the frame is not sent to switch 102B, which would have required sending the frame over links 104, adding in latency and traffic on links 104.

While switch 102B detects the failed link between it and node 112, it continues to communicate this status to switch 102A until the failed link is restored. Alternatively, switch 102A sets the downstream link failure indicator to indicate the failure until switch 102B communicates that the link has been restored. When the link has been restored, switch 102A sets the indicator to show that the failure is no longer present. In embodiments where the CFI bit is used as the downstream link failure indicator, the CFI is set to a second value of "0" in frames travelling from node 112 to node 110. When a frame from M1 is received by node 110 having its CFI bit set to "0", node 110 re-writes the entry in the MAC address table to associate M1 with parent LAG 120. Thereafter (absent another downstream link failure), frames received by node 110 that include M1 as their destination address are hashed on parent LAG 120 and so may be sent to either switch 102A or switch 102B.

In some embodiments of information handling system 200, some actions may be taken to ensure that the computer processor of node 110 does not re-write the MAC address table entry associated with M1 before node 110 receives indication of the link restoration. For example, in some embodiments sub-LAG 202 and sub-LAG 204 are used only for frames egressing from node 110, while ingressing frames may be received as on parent LAG 120. In such an instance, the normal MAC learning operations may cause undesired station moves that over-write a MAC address table entry associating a MAC address with a sub-LAG.

One option for preventing unwanted station moves may include using class-based station moves. In such an embodiment, each port or port-channel on node 110 may be assigned a class or a priority. A higher class priority may be assigned to sub-LAG associations than to parent LAG associations, to prevent unwanted station moves from a sub-LAG to a parent LAG. An embodiment that uses a BROADCOM® TRIDENT™ chipset provided by BROADCOM of Irvine, Calif., may provide such class or priority-based station moves, though other chipsets providing the same or similar functions may be used as well.

As long as frames do not reach the CPU, the CPU does not extract the information to update the MAC address table entry. In some embodiments, the MAC address table includes a class identification field, which can be used as a qualifier in the ingress field processor (IFP) entry. For MAC address table entries that the CPU re-writes to point to a sub-LAG, a designated class identification value is set in the entry. When the IFP applies rules to copy frames to the CPU, resources may be conserved by only copying frames that don't have a class identification value associated in the MAC address table for the MAC address at issue.

Figure 3:
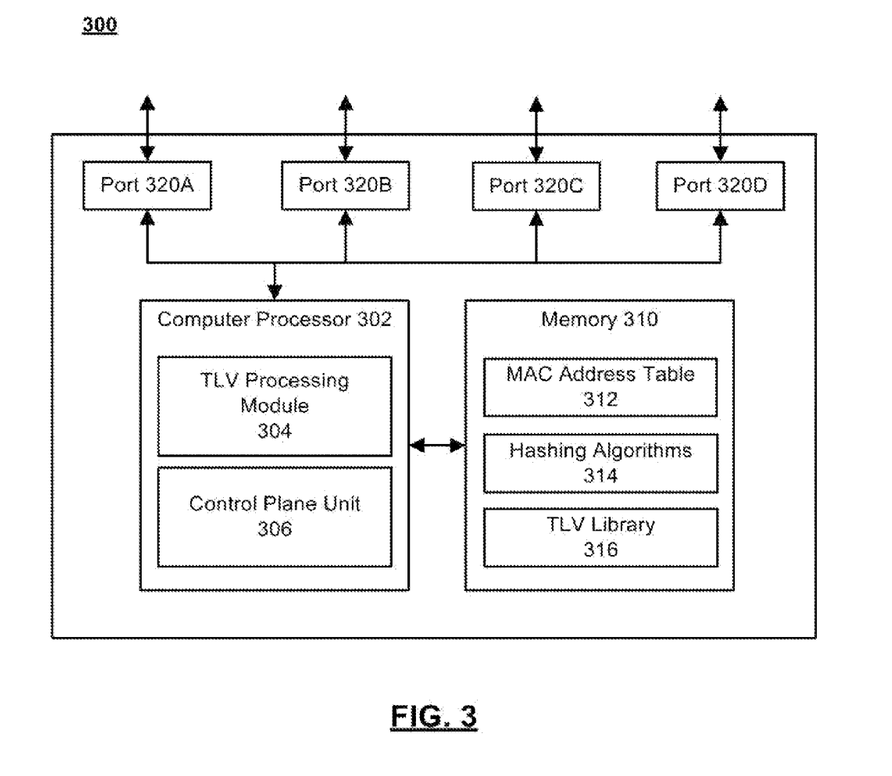
FIG. 3 is an additional diagram of an information handling system that includes two switches configured as a single logical switch in operation during a downstream link failure according to an embodiment.

FIG. 3 is a functional diagram of an information handling device 300 that may be useful in understanding how node 110 of FIGS. 2A and 2B operates. Information handling device 300 may be a server or a switch, such as a top-of-rack switch or the VLT peer switches of information handling system 200. Hereinafter, information handling device 300 is referred to as node 300.

Node 300 includes a computer processor 302 in communication with a memory 310 and a plurality of ports 320A-D. While depicted as a single processor in FIG. 3, computer processor 302 may be a plurality of computer processors functioning together to provide various capabilities and features. In the depicted embodiment, computer processor 302 provides a type-length-value (TLV) processing module 304 and a control plane unit 306. When an LLDP data unit is received on one of ports 320A-D, the frame is processed by computer processor 302's TLV processing module 304. LLDP data units may be used to form sub-LAGS 202 and 204.

Any TLVs and any information included in the LLDP data units may be extracted by the TLV processing module 304. For example, as described above in connection with information handling system 200, an LLDP data unit may include a TLV that indicates the sender of the LLDP data unit, such as the Chassis ID TLV. When the TLV processing module 304 processes the Chassis ID TLV and other TLVs, it may extract the chassis identifier and store it, in connection with the port on which the LLDP data unit was received, in one or more look-tables including a MAC address table 312. In addition to the TLV processing module 304, node 300 includes a TLV library 316 that has a plurality of TLVs that can be included in LLDP data units sent by node 300 to any devices connected to ports 320A-D.

When sending a data packet or frame received on node 300 from an attached host (not depicted), computer processor 302 performs a look-up in MAC address table 312 stored in memory 310. The frame's VLAN ID and destination MAC address may be used to determine, by performing the look-up, that the frame may be hashed on the first sub-LAG 202. Computer processor may select from a plurality of hashing algorithms 314 stored in memory 310 to hash the frame to either port 320A or 320B, the member ports of the first sub-LAG 202 in the depicted embodiment. Also in the depicted embodiment, if MAC address table 312 indicates that frames with the particular destination MAC address may be hashed on parent LAG 120, then computer processor 302 hashes the frame on one of ports 320A, 320B, 320C, or 320D, the member ports of parent LAG 120. By controlling the LAG on which the frame is hashed, node 300 may send the frame more directly to another node in order to avoid detour through interconnect links 104 due to a failed VLT link.

Figure 4A:
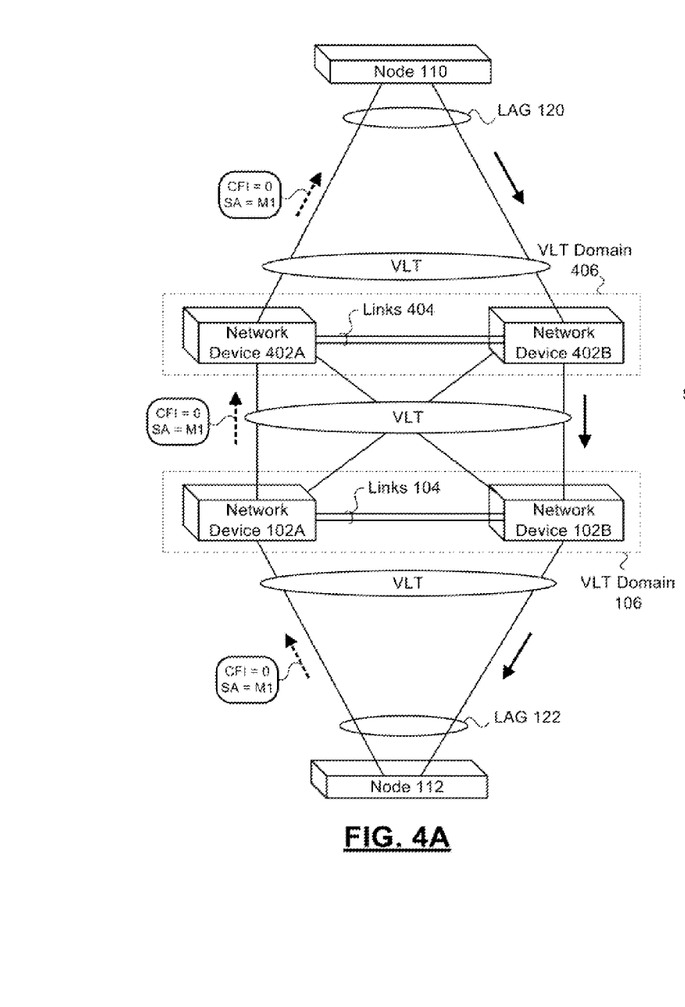
FIG. 4A is a diagram of an information handling system that includes a four switches configured as two interconnected logical switches during a downstream link failure.
Figure 4B:
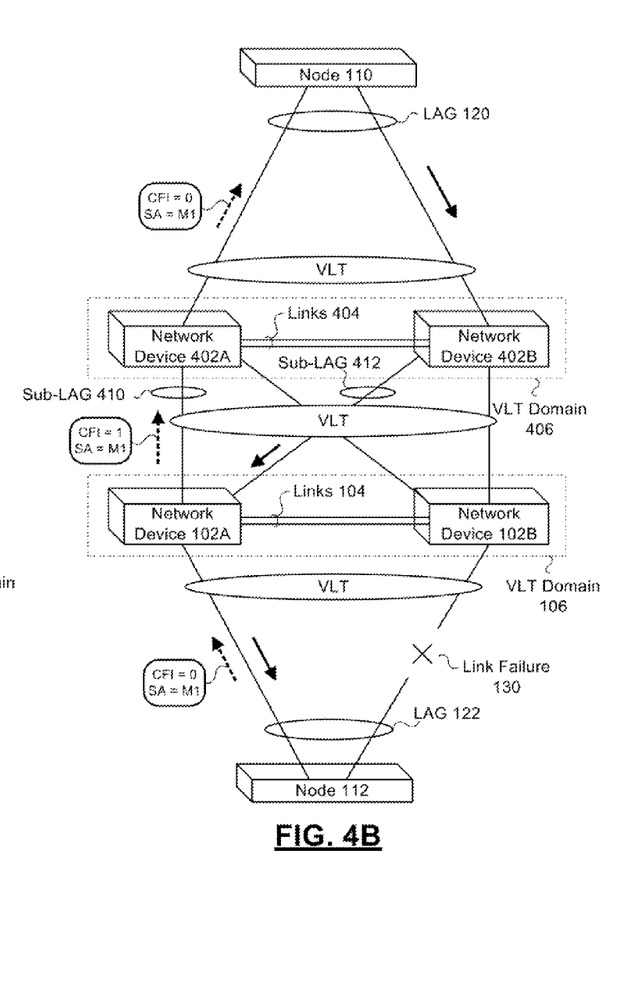
FIG. 4B is an additional diagram of an information handling system that includes four switches configured as two interconnected logical switches during a downstream link failure according to an embodiment.

FIGS. 4A and 4B depict an information handling system 400, which in many respects is similar to information handling system 200 of FIG. 2. Whereas the configuration of nodes and VLT peers in FIGS. 1A, 1B, 2A, and 2B may be referred to as a triangular VLT configuration, information handling system 400 may be referred to as a square VLT configuration. In a square VLT configuration information handling system 400 includes a first VLT domain 106 that includes two VLT peers: network devices 102A and 102B. Information handling system 400 also has a second VLT domain 406 that includes network devices or switches 402A and 402B as VLT peers connected by interconnect links 404. Each VLT peer of VLT domain 106 is connected to each VLT peer of VLT domain 406, and each VLT peer may be similar to information handling device 300 of FIG. 3.

In FIG. 4A, a frame is sent from node 110 having a destination MAC address accessible by node 112. Depicted in solid lines, the frame travels from node 110 to network device 402B in VLT domain 406. For brevity, the network devices in FIGS. 4A and 4B are referred to hereafter as "switches." In another example, the frame may be hashed on LAG 120 to switch 402A, rather than switch 402B.

From switch 402B, the frame is hashed on one of two sub-LAGs (only one being depicted) connected to switches 102A and 102B in VLT domain 106. As depicted the frame is sent from switch 402B to switch 102B and then to node 112. An exemplary responsive frame is depicted as travelling from node 112 to network device 102A, to network device 402A, and then finally to node 110. Again, the hashing performed by the nodes or switches in information handling system 400 may be different from those in the depicted frame flow and in many cases are.

In FIG. 4B, a link failure 130 is present on the link between switch 102B and node 112, such that traffic cannot flow over this link. Information handling system 400 is configured to mitigate the effects of link failure 130 in the following manner Switch 102B is aware of link failure 130 and communicates the presence of the failure to switch 102A over interconnect links 104. Once switch 102A receives information of the failure from switch 102B, switch 102A begins setting the value of the CFI bit contained in frames sent upstream from node 112 to a first value that indicates the presence of link failure 130. In the depicted embodiment, the first value is "1". As explained in connection with information handling system 200 of FIG. 2B, if the frame received from node 112 does not have a CFI bit, a priority tag may be added to the frame to contain the CFI bit.

In the depicted embodiment, the frame is hashed to switch 402A, while in other embodiments the frame may be hashed to switch 402B. When switch 402A receives the packet with the CFI bit set to the first value indicating the presence of link failure 130, switch 402A reacts similarly to node 110 as described in the discussion of node 110's response in the information handling system 200 in FIGS. 2A and 2B. Thus, switch 402A associates the MAC address M1 with sub-LAG 410 in a MAC address table entry contained in internal memory. When switch 402A receives a frame with M1 as its destination MAC address, it hashes the frame only on sub-LAG 410, which is a LAG or port-channel half that includes all links connecting switch 402A to switch 102A and excludes all links connecting switch 402A and 102B, which switch 402A may recognize as part of an additional sub-LAG (not depicted). Thus, switch 402A sends frames to switch 102A, preventing the extra hop and added latency that may occur by sending frames to switch 102B.

This behavior is achieved without node 110 reacting to the link failure. Switch 402A transmits the frame on to node 110 with the CFI bit set to the second value, in this example "0", thus not indicating any link failure, since the link failure is mitigated by switches 402A and 402B. Thus, node 110 does not need to be made aware of the link failure and so switch 402A may be configured to reset the CFI bit from "1" to "0" before forwarding any received frames to it. Frames are received on switch 102A in such a way that the MAC address table entry is not over-written until the CFI bit's value reverts to a second value of "0", indicating the end of the link failure 130.

Additionally, switch 402A communicates the link failure to switch 402B over interconnect links 404. Switch 402B alters an entry in its MAC address table so that it behaves the same as switch 402A with respect to frames having the M1 MAC address. Thus switch 402B hashes frames received from node 110 that include M1 as the destination MAC address on a sub-LAG 412 to switch 102A, rather than on a parent LAG (not depicted) that could result in the frame being sent to switch 102B. When switch 402A receives communication indicating the link failure is resolved, this may be communicated to switch 402B over interconnect links 404 as well, allowing the MAC address table entry to re-associated M1 with the parent LAG.

Figure 5:
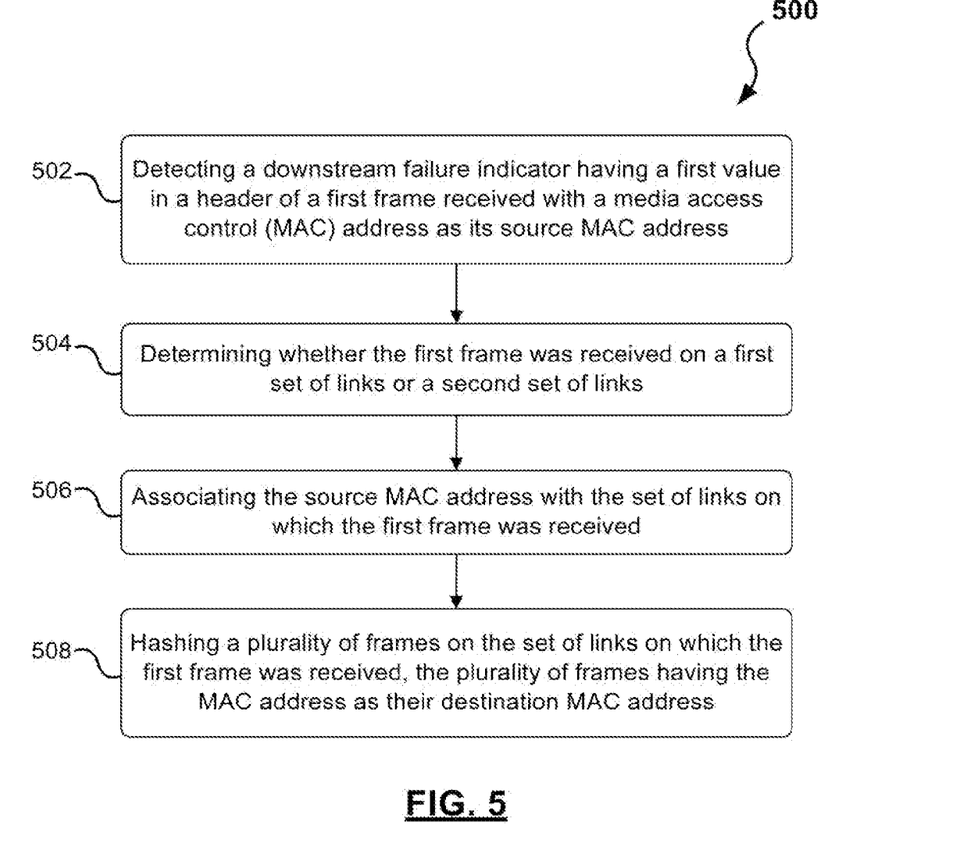
FIG. 5 is a flowchart of method for directing traffic through a set of redundant links during failure of a downstream link according to an embodiment.

FIG. 5 is a flowchart of a method 500 for directing traffic through a set of aggregated links during a failure of a downstream link. Method 500 begins in step 502 when a network device, such as information handling system 300 of FIG. 3, detects a downstream failure indicator having a first value in a header of a first frame received with a MAC address as its source MAC address. The network device determines whether the first frame was received on a first set of links or a second set of links, in step 504. In step 506, the network device associates the source MAC address with the set of links on which the first frame was received, and hashes a plurality of frames on the set of links on which the first frame was received, the plurality of frames having the MAC address as their destination MAC address, in step 508.

In operation, it may be useful to understand how method 500 may be carried out by a network device having the features of node 300 of FIG. 3 in an information handling system like information handling system 200 of FIGS. 2A and 2B. For example, node 110 receives a frame from node 112 with M1 as its source MAC address and that has a VLAN ID and a downstream link failure indicator set in its header (step 502). The downstream link failure indicator is a CFI bit set to "1" in the header. Node 110 determines whether the frame was received on the set of links connecting to switch 102A or the set of links connecting to switch 102B (step 504). Node 110 associates the source MAC address of the frame with whichever set of links on which the frame was received in a MAC address table (step 506). In so doing, node 110 may associate the source MAC address and VLAN ID with either sub-LAG 202 or sub-LAG 204 in the MAC address table. When node 110 needs to send a frame to the device or service identified by the source MAC address, the frame is hashed on either sub-LAG 202 or sub-LAG 204, as associated in the MAC address table (step 508). Method 500 can also be explained in the context of information handling system 400 of FIG. 4. In such examples, switches 402A or 402B may implement method 500 rather than node 110.

Figure 6:
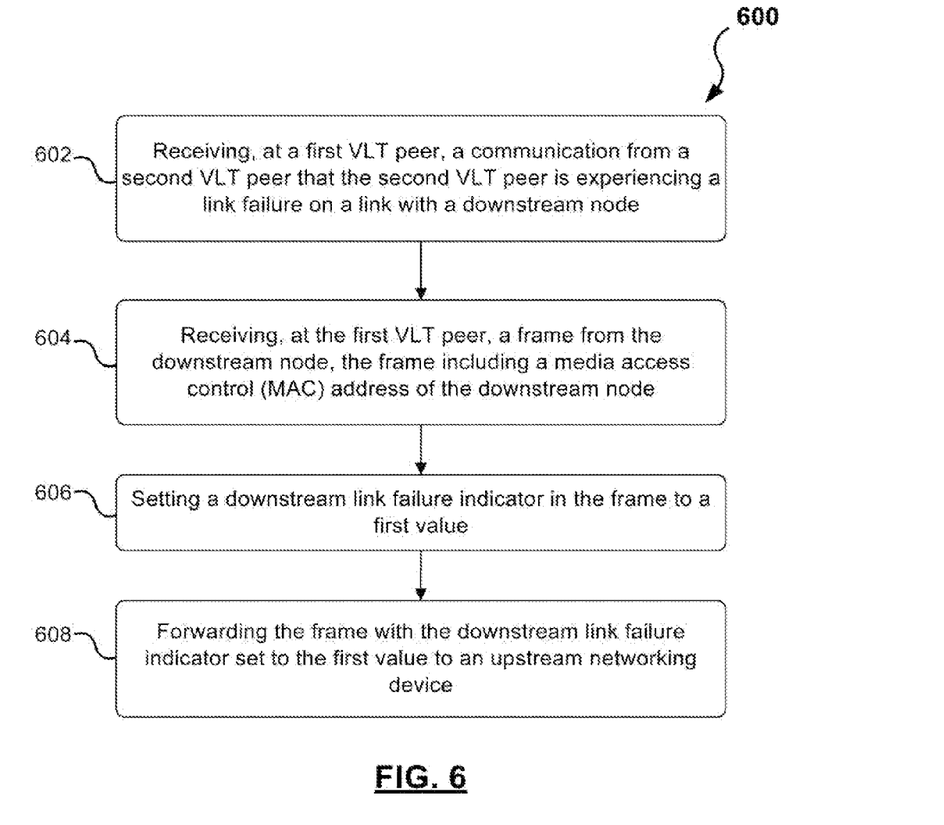
FIG. 6 is a flowchart of an additional method for directing traffic through a set of redundant links during failure of a downstream link according to an embodiment.

FIG. 6 is a flowchart of a method 600 for directing traffic through a set of aggregated links during a failure of a downstream link. Method 600 may begin in step 602 when a first VLT peer network device receives a communication from a second VLT peer that the second VLT peer is experiencing a link failure on a link with a downstream node. In step 604, the first VLT peer receives a frame from the downstream node, the frame includes a MAC address of the downstream node. In step 606, the first VLT peer sets a downstream link failure indicator in the frame to a first value, and then forwards the frame to an upstream network device, in step 608.

Method 600 may be better understood with reference to FIGS. 2A, 2B, 4A, and 4B. For example, method 600 may be performed when switch 102A receives a communication from switch 102B that the link or links between switch 102B and node 112 are down (step 602). Switch 102A receives a frame from node 112 that includes a MAC address accessible at or through node 112 (step 604). Before transmitting the packet upstream toward node 110, switch 102A sets a CFI bit to "1" to communicate the presence of the downstream link failure to network devices upstream and then forwards the frame to an upstream network device (steps 606 and 608). As depicted in FIGS. 2A and 2B, the upstream network device is node 110. However, in embodiments like that depicted in FIG. 4, the upstream network device is an additional switch, like switch 402 in VLT domain 406.

Some embodiments of information handling systems 200 and 400 include non-transient, tangible, machine-readable media that include executable code that when run by a processor, such as computer processor 302 of node 300 in FIG. 3, may cause the processor to perform the steps of method 500 or 600 as described above. Some common forms of machine-readable media that may include the steps of methods 500 and/or 600 are, for example, floppy disk, flexible disk, hard disk, magnetic tape, any other magnetic medium, CD-ROM, any other optical medium, punch cards, paper tape, any other physical medium with patterns of holes, RAM, PROM, EPROM, FLASH-EPROM, any other memory chip or cartridge, and/or any other medium from which a processor or computer is adapted to read. The machine-readable media may be memory 310 of FIG. 3.

The examples provided above are exemplary only and are not intended to be limiting. One skilled in the art may readily devise other systems consistent with the disclosed embodiments which are intended to be within the scope of this disclosure. As such, the application is limited only by the following claims.

What is claimed is:

1. An information handling system comprising:
a first network switch, the first network switch including:
a computer processor in communication with a plurality of ports for receiving and sending frames, the computer processor configured to read frames, each frame having a header;
a memory coupled to the computer processor and including a media access control (MAC) address table;
and wherein the computer processor is configured to associate a MAC address and a virtual local access network (VLAN) identifier with a parent link aggregation group (LAG) except while a downstream link failure is detected, the computer processor being configured to associate the MAC address and the VLAN identifier with a sub-LAG while a downstream link failure is detected.

2. The information handling system of claim 1, wherein the computer processor is configured to detect the downstream link failure by reading headers of frames including the MAC address as their source MAC address.

3. The information handling system of claim 2, wherein the headers include a downstream link failure indicator set to a first value to indicate the presence of the downstream link failure, the downstream link failure indicator being a Canonical Format Indicator bit in a VLAN tag header.

4. The information handling system of claim 3, wherein the computer process is configured to rewrite an entry in the MAC address table when the first network switch receives a data frame having the MAC address as its source MAC address and having the downstream link failure indicator set to a second value.

5. The information handling system of claim 1, further comprising a control plane unit (CPU) and an ingress field processor (IFP) provided by the computer processor wherein:
the IFP applies a set of rules determining whether or not frames are copied to the CPU; and
the CPU associates the MAC address with the parent LAG or the sub-LAG in the MAC address table.

6. The information handling system of claim 5, wherein the MAC address table includes a priority field, wherein an entry in the MAC address table has a first priority when the entry includes an association with the sub-LAG and a second priority when the entry includes an association with the parent LAG.

7. The information handling system of claim 1, further comprising:
a second network switch and a third network switch, the second and third network switches being configured in a virtual link trunking (VLT) domain and being coupled to the first network switch by the parent LAG and to a fourth network switch by an additional LAG, and wherein
the parent LAG includes a first set of links coupling the first and second network switches and a second set of links coupling the first and third network switches, and
the additional LAG includes a third set of links coupling the fourth and second network switches and a fourth set of links coupling the fourth and third network switches.

8. The information handling system of claim 7, wherein the third network switch is configured to send an alert to the second network switch when the fourth set of links fails, and the second network switch is configured to set a downstream link failure indicator to a first value upon receipt of the alert.

9. The information handling system of claim 7, wherein more than two network switches are configured in the VLT domain.

10. The information handling system of claim 1, wherein the first switch and a second switch are in a first virtual link trunking (VLT) domain and coupled to a second VLT domain, and wherein the first switch is configured to communicate the downstream link failure to the second switch so that a computer processor of the second switch associates the MAC address with a second sub-LAG rather than a second parent LAG for a duration of the downstream link failure, the second parent LAG and the second sub-LAG being provided by the second switch and including links from the second switch to the second VLT domain.

11. The information handling system of claim 1, wherein the parent LAG includes a plurality of aggregated links coupled to the first network switch and the sub-LAG includes a subset of the plurality of aggregated links.

12. A method for directing traffic through a set of aggregated links coupled to a network switch during failure of a downstream link, the method comprising:
configuring a first set of links and a second set of links, each set of links being a subset of the set of aggregated links;
detecting a downstream failure indicator having a first value in a header of a first frame received with a media access control (MAC) address as its source MAC address;
determining whether the first frame was received on the first set of links or the second set of links;
associating the source MAC address and a virtual local area network (VLAN) identifier in the header with the set of links on which the first frame was received; and
hashing a plurality of frames on the set of links on which the first frame was received, the plurality of frames having the MAC address as their destination MAC address.

13. The method of claim 12, further comprising:
detecting a downstream failure indicator having a second value in a header of a second frame received with the MAC address as its source MAC address;
associating the source MAC address with a parent link aggregation group (LAG) that includes the first set of links and the second set of links;
hashing, on the parent LAG, a plurality of frames having the MAC address as their destination MAC.

14. The method of claim 12, wherein the first set of links is grouped in a first sub-LAG and the second set of links is grouped in a second sub-LAG.

15. The method of claim 14, wherein the first sub-LAG and the second sub-LAG are formed by the operation of a link layer discovery protocol to discover which links are attached between a first network switch and a pair of network switches in a virtual link trunking (VLT) domain.

16. The method of claim 12, where the downstream link failure indicator is a Canonical Format Indicator bit in a VLAN tag header.

17. The method of claim 12, wherein the set of aggregated links is configured as one or more port-channels.

18. A non-transitory computer-readable medium having instructions for execution by one or more processors that, when executed, cause the one or more processors to perform a method for directing traffic through a set of aggregated links during failure of a downstream link, the method comprising:
receiving, at a first VLT peer, a communication from a second VLT peer that the second VLT peer is experiencing a link failure on a link with a downstream node;
receiving, at the first VLT peer, a frame from the downstream node, the frame including a media access control (MAC) address of the downstream node;
setting a downstream link failure indicator in the frame to a first value; and
forwarding the frame with the downstream link failure indicator set to the first value to an upstream networking device;
wherein setting the downstream link failure indicator in the frame comprises:
determining whether the frame is a tagged frame;
when the frame is tagged, setting a Canonical Format Indicator (CFI) bit in the frame to a first value to indicate the link failure to the upstream networking device; and
when the frame is untagged, attaching a priority tag to the frame to add the CFI bit to the frame and setting the CFI bit to the first value to indicate the downstream link failure to the upstream networking device.

19. The non-transitory computer-readable medium of claim 18, wherein the first and second VLT peers are in a first VLT domain, and the upstream networking device is one of a third VLT peer and a fourth VLT peer in a second VLT domain.

20. The non-transitory computer-readable medium of claim 18, wherein the set of aggregated links is configured as one or more port-channels.

* * * * *